Dec. 13, 1927.
J. M. NAUL
1,652,319
ELECTRIC MOTOR AND TRANSMITTER UNIT
Original Filed May 9, 1925  2 Sheets-Sheet 1
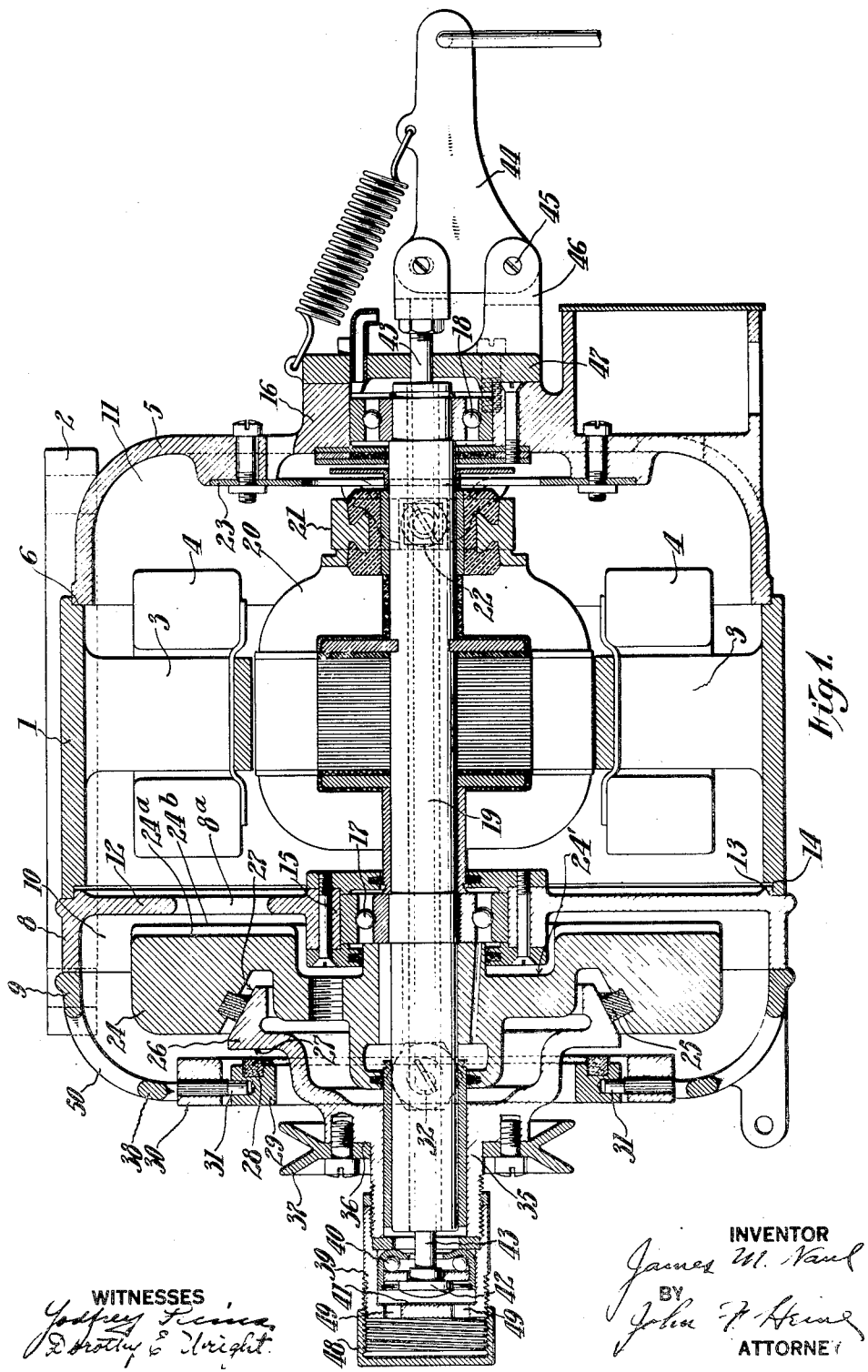

Dec. 13, 1927.
J. M. NAUL
1,652,319
ELECTRIC MOTOR AND TRANSMITTER UNIT
Original Filed May 9, 1925
2 Sheets-Sheet 2
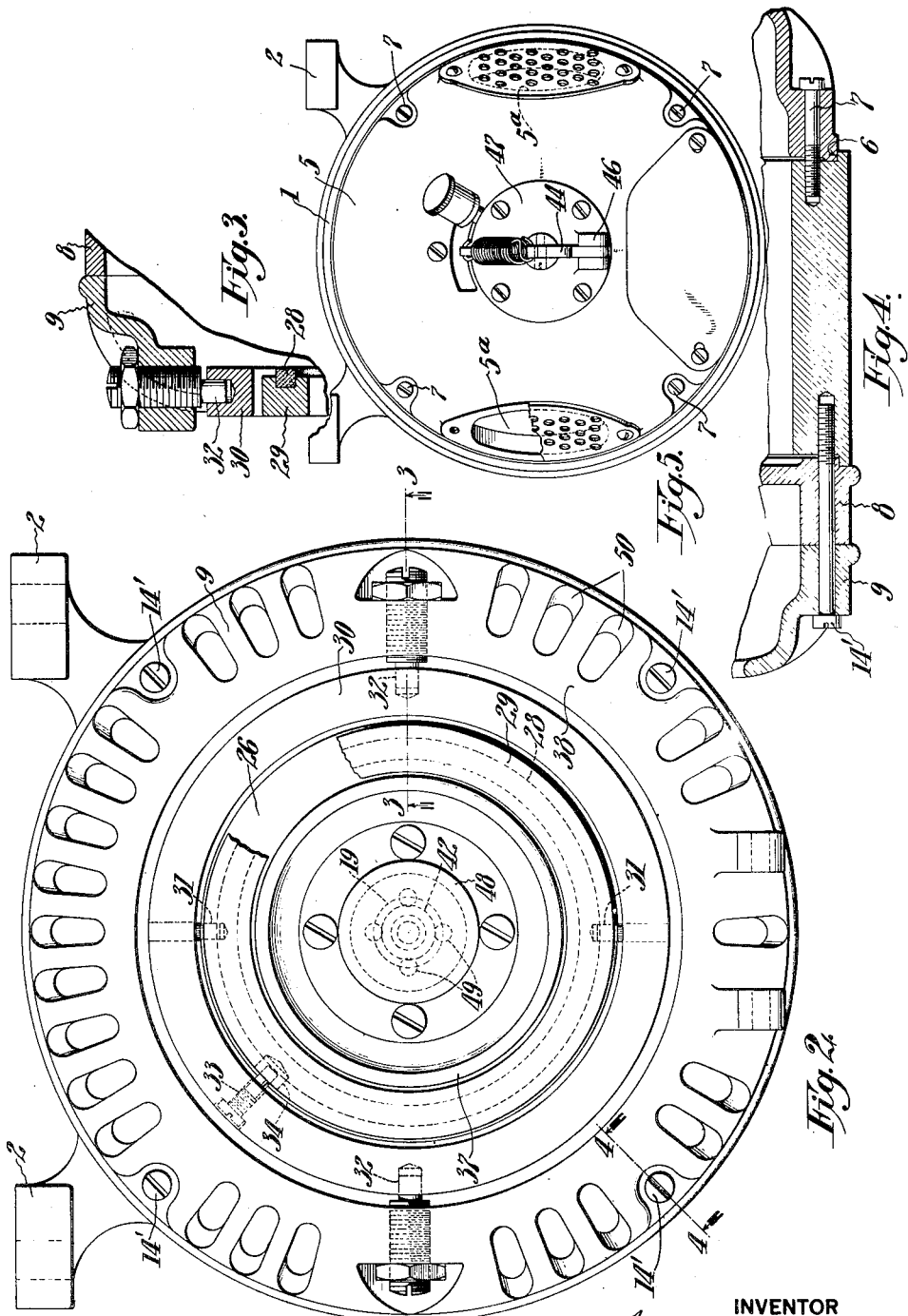
INVENTOR
James M. Naul
BY
John F. Heine
ATTORNEY Patented Dec. 13, 1927.

1,652,319

UNITED STATES PATENT OFFICE.

JAMES M. NAUL, OF PLAINFIELD, NEW JERSEY, ASSIGNOR TO THE SINGER MANUFACTURING COMPANY, OF ELIZABETH, NEW JERSEY, A CORPORATION OF NEW JERSEY.

ELECTRIC MOTOR AND TRANSMITTER UNIT.

Application filed May 9, 1925, Serial No. 28,998. Renewed April 13, 1927.

This invention relates to electric power-transmitters cr unitary electric motor and clutch devices, such as are customarily used as individual driving units for sewing or other small machines requiring to be frequently started and stopped at the will of the operator.

An object of the invention is to provide an electric transmitter unit of minimum size and overall length without sacrifice of power and pick-up characteristics.

A further object of the invention is to provide an electric transmitter unit, the working parts of which are substantially enclosed and require a minimum amount of attention to maintain them in efficient operative condition.

Still further, the invention has for an object to provide an electric transmitter unit which is constructed so that access to its parts is facilitated and so that it may be readily manufactured and assembled.

To the attainment of the ends in view the present electric transmitter unit is constructed with a hollow cylindrical frame having an internal transverse partition dividing it into separate motor and clutch compartments. The electric motor elements are mounted in the motor compartment and the motor-shaft is journaled in bearings carried by the internal partition and the outer end wall of the motor compartment. The motor-shaft has no further bearing supports but is extended at one end through the clutch compartment and has fixed thereto within the clutch compartment a driving clutch-member which is preferably in the form of a fly-wheel having a weighted rim and a conical friction clutch face. The driven clutch-member is preferably mounted to slide and rotate on and relative to the motor-shaft and is formed within the clutch compartment with a conical friction clutch face mating with that of the driving wheel. The driven clutch-member drives a belt-pulley disposed outside of the clutch compartment. Suitable treadle-controlled clutch-operating connections are provided, as well as braking means for the driven clutch-member. The frame of the unit preferably comprises a cylindrical motor field frame section and removable end sections one of which constitutes the clutch compartment and is preferably split transversely of the motor-shaft into two separable elements to facilitate the assembly of and access to the parts of the clutch mechanism.

For a fuller understanding of the invention, reference is had to the following detailed description of a preferred embodiment thereof, accompanied by drawings in which Fig. 1 is a longitudinal section of the complete transmitter unit. Fig. 2 is a left end-elevation. Fig. 3 is a fragmentary sectional view on the line 3—3, Fig. 2. Fig. 4 is a fragmentary sectional view on the line 4—4, Fig. 2, and Fig. 5 is a right end elevation of the complete transmitter unit.

The frame of the transmitter unit illustrated is of hollow cylindrical form and comprises a motor field frame section 1 having attaching feet 2 whereby the device may be mounted, say, on the under side of a sewing machine table. The frame section 1 includes the usual field poles 3 carrying the field coils 4. The field frame section 1 is closed at one end by the end frame section or end-bonnet 5 which is centered by means of the circular groove 6 and held in position by screws, such as shown at 7, Fig. 4. The field frame section 1 is closed at its other end by an intermediate frame-element 8 which, together with the end frame-element 9 constitutes a hollow end-section having a cavity or clutch compartment 10 therewithin. The space within the frame sections 8, 1, 5, constitutes the motor-compartment 11 which is separated from the clutch compartment 10 by the internal partition 12 forming a part of the frame-element 8. The frame-element 8 is centered on the frame section 1 by providing the element 8 with a projecting ring 13 fitting a corresponding groove 14 in the section 1. Suitable screws 14' secure the elements 8 and 9 together and to the section 1.

The intermediate element 8 and end section 5 are formed, respectively, with central apertured supports 15, 16 for the ball-bearings 17, 18 in which the hollow motor shaft 19 is journaled; such shaft being extended at one end through the clutch-compartment 10. The motor-shaft carries the usual armature 20 and commutator 21 upon which bear the usual brushes one of which is indicated at 22; the brushes being mounted in suitable brush-holders carried by the brush-holder ring 23. The field and armature windings are of the usual direct-current type.

Fixed to the shaft 19 within the clutch-compartment 10 is the fly-wheel 24 having a weighted rim and an undercut conical face carrying the friction leather 25. The fly-wheel is also cut away at 24' to clear the bearing support 15 and lie close to the partition wall 12; the object being to reduce the longitudinal dimensions of the main frame or body-portion of the unit to a minimum.

Also disposed within the clutch-compartment 10 is the driven clutch element 26 having a conical friction clutch face 27 adapted to engage that of the fly-wheel 24. The member 26 is also formed with a flat braking surface 27 adapted to engage the brake leather 28 carried by the ring 29 mounted by means of a gimbal ring 30 in the frame-element 9. The brake ring is mounted on the diametrically opposed pins 31 carried by the gimbal ring 30 which latter is supported by the eccentric pins 32 carried by the frame-element 9. The screw 33 carried by the ring 30 and entering an enlarged hole 34 in the ring 29 limits the tilting movement of said rings relative to one another.

The hub 35 of the driven clutch member 26 is extended exteriorly of the clutch compartment 10 and is formed with a shoulder 36 to which is secured the belt-pulley 37 to be connected with the machine to be driven; said pulley being outside of the clutch compartment 10 but arranged closely adjacent the plane of the end-wall 38 of the frame-element 9.

The hub 35 of the driven clutch member is threaded to receive the cap 39 which encloses the ball-thrust bearing 40 against which and the inner end-wall 41 of the cap 39 the head 42 of the push-and-pull rod 43 is adapted to bear, to shift the driven clutch member into engagement with the driven clutch member 24 or brake 29. The rod 43 extends through the hollow motor shaft 19 and is connected at its other end to the treadle-controlled lever 44 which is fulcrumed at 45 in the bifurcated lug 46 on the end cap 47; the latter closing the outer end of the aperture in the support 16 for the shaft bearing 18. A grease cup 48 serves to supply lubricant through holes 49 to the ball-thrust bearing 40. Individual grease cups, not shown, may be used to supply lubricant to the bearings 17, 18.

The fly wheel 24 is formed on its inner face 24ª with radial fins 24ᵇ which cause a circulation of air through the unit; said fins drawing air through the ventilating openings 5ª, Fig. 5, in the end-bonnet 5 and through openings 8ª in the partition 8, finally forcing the air out through the openings 50 in the end frame element 9.

By providing an electric transmitter unit of minimum length the distance of the body of the motor from the operator is increased sufficiently to avoid discomfort to the operator caused by the natural heating of the motor. Also, the air draft through the motor is away from the operator.

The motor-shaft is sustained by its own bearings 17, 18, which are entirely independent of the bearing for the driven clutch member. Except for the ventilating apertures 50 and the necessary working clearance between the frame-element 9, rings 29, 30 and the hub of the driven clutch member 26, the clutch compartment 10 is closed at its outer end and the clutch members are fully protected within the frame of the transmitter unit which is entirely self-contained and may be mounted on the power-table the same as an ordinary electric motor. The working range of movement of the driven clutch member is adjustable by turning the eccentric pins 32 to thereby shift the brake-ring 29 toward or away from the driving clutch member 24.

Having thus set forth the nature of the invention, what I claim herein is—

1. An electric power-transmitter comprising a hollow cylindrical frame having an internal transverse partition dividing it into motor and clutch compartments, shaft bearings at the opposite ends of the motor compartment, one of said bearings being carried by said transverse partition, a motor shaft journaled in said bearings and extended at one end through and beyond said clutch compartment, coacting stationary and rotary motor elements disposed in said motor compartment, said rotary motor element being carried by said shaft, a driving clutch member fixed to said shaft within said clutch compartment, a driven clutch member adapted to engage said driving clutch member within said clutch compartment and having a hub extended exteriorly thereof, a belt-pulley fixed to said hub exteriorly of said clutch compartment, and manually controlled means for effecting engagement and disengagement of said clutch members.

2. An electric motor and friction-clutch unit comprising a cylindrical motor field frame, end-bonnets secured to said frame, a motor-armature and shaft journaled in said end-bonnets, one of said end-bonnets being formed with a fly-wheel cavity at the side of the motor shaft bearing remote from the motor-armature, a fly-wheel fixed to the motor-shaft within said cavity, said fly-wheel having a weighted rim and a friction driving face, a driven clutch-member and belt-pulley journaled on the motor-shaft adjacent said fly-wheel, manually controlled means for shifting said driven clutch-member toward and away from said fly-wheel, and a friction brake carried by the end-bonnet adjacent the driven clutch-member in position to be engaged by the latter.

3. An electric motor and friction-clutch unit comprising a cylindrical motor frame, end-bonnets secured to said frame, a motor-armature and shaft journaled in said end-bonnets, one of said end-bonnets being formed with an internal cavity and being split transversely of the motor-shaft into two separable elements the inner of which is formed with a bearing for the motor shaft, a brake ring carried by the outer element of said split end-bonnet, a fly-wheel fixed to the motor-shaft within the cavity of said split end-bonnet and formed with a driving friction clutch face, a driven clutch-member journaled on the motor-shaft and having a driven friction clutch face disposed within said cavity, the hub of said driven clutch member being extended through said brake ring externally of said cavity, a belt-pulley secured to said hub, and manually controlled means for shifting said driven clutch member axially of the motor-shaft.

4. An electric motor and friction clutch unit comprising a substantially cylindrical frame having a transverse internal partition dividing the space within said frame into motor and clutch compartments, a motor-shaft disposed coaxially of said frame and journaled in bearings carried, respectively, by said partition and the end wall of the motor-compartment, a motor-armature fixed to the motor-shaft between said bearings, a motor-field embracing said motor-armature, a fly-wheel fixed to said shaft within the clutch compartment and formed with a friction driving face, a driven clutch member rotatably and slidably carried by said shaft and having a driven clutch face disposed within said clutch compartment and a hub extended exteriorly of said compartment, a belt-pulley fixed to said hub externally of said clutch-compartment, a stationary brake cooperatively related to said driven clutch member, and manually controlled means for shifting said driven clutch member into engagement with either said fly-wheel or said brake.

5. An electric transmitter comprising a hollow cylindrical field frame, end-bonnets secured to the opposite ends of said field frame, one of said end-bonnets being in the form of a two-part hollow housing, split transversely of the longitudinal axis of said cylindrical field frame, a motor-shaft having bearings in said end-bonnets, the bearing in the two part end-bonnet being in the inner section thereof adjacent the field frame, an armature carried by the motor-shaft within the field frame, a fly-wheel carried by the motor-shaft within said hollow two-part end-bonnet and having a friction clutch face, a driven member having a mating clutch face within said two-part end-bonnet and a hub extending exteriorly thereof, a belt-pulley disposed exteriorly of said two-part end-bonnet and connected to be driven by said driven clutch member, and manually controlled means for establishing and interrupting driving relation between said clutch members.

6. The combination set forth in claim 5 with a brake disposed within said two-part end-bonnet in cooperative relation with the driven clutch member.

7. An electric transmitter comprising a hollow cylindrical field-frame element, end field-frame elements secured to said cylindrical field-frame element and formed with bearing supports, a motor armature and shaft journaled in said bearing supports, a fly-wheel fixed to the motor shaft externally of said cylindrical field-frame element and formed with a friction clutch-face, a driven clutch-member slidably and rotatably journaled on the motor-shaft and formed with a mating friction clutch-face, a ring-shaped clutch-housing end-element having its outer peripheral portion secured to the end field-frame element adjacent said fly-wheel, said clutch-housing end-element having a clearance opening through which the motor-shaft and the hub of the driven clutch-element extend without touching said clutch-housing end-element, a belt-pulley carried by the driven clutch element externally of the clutch-housing end-element, and manually controlled means for sliding said driven clutch-member into and out of engagement with the driving member.

In testimony whereof, I have signed my name to this specification.

JAMES M. NAUL.